(12) United States Patent
Keil

(10) Patent No.: US 7,249,054 B2
(45) Date of Patent: Jul. 24, 2007

(54) SYSTEM AND METHOD FOR DEBIT ACCOUNT TRANSACTIONS

(76) Inventor: Dean S. Keil, 5019 80th Ter. South, Lake Worth, FL (US) 33467

( * ) Notice: Subject to any disclaimer, the term of this patent is extended or adjusted under 35 U.S.C. 154(b) by 670 days.

(21) Appl. No.: 09/839,471

(22) Filed: Apr. 19, 2001

(65) Prior Publication Data

US 2001/0023415 A1 Sep. 20, 2001

Related U.S. Application Data

(63) Continuation-in-part of application No. 09/334,887, filed on Jun. 17, 1999.

(60) Provisional application No. 60/089,755, filed on Jun. 18, 1998.

(51) Int. Cl.
*G06G 1/12* (2006.01)
(52) U.S. Cl. .......................................... 705/21; 705/16
(58) Field of Classification Search ................. 705/21, 705/16
See application file for complete search history.

(56) References Cited

U.S. PATENT DOCUMENTS

| | | | |
|---|---|---|---|
| 4,823,264 A | | 4/1989 | Deming |
| 5,455,407 A | | 10/1995 | Rosen |
| 5,577,109 A | | 11/1996 | Stimson et al. |
| 5,696,909 A | * | 12/1997 | Wallner ........................ 705/44 |
| 5,764,789 A | * | 6/1998 | Pare et al. ................... 382/115 |
| 5,815,657 A | | 9/1998 | Williams et al. |
| 5,892,827 A | | 4/1999 | Beach et al. |
| 5,915,526 A | | 6/1999 | Martineau |
| 5,953,398 A | | 9/1999 | Hill |
| 5,982,891 A | | 11/1999 | Ginter et al. |
| 6,032,859 A | * | 3/2000 | Muehlberger et al. ...... 235/449 |
| 6,192,142 B1 | | 2/2001 | Pare, Jr. et al. |
| 6,473,500 B1 | * | 10/2002 | Risafi et al. ............ 379/144.01 |
| 6,477,513 B1 | * | 11/2002 | Walker et al. ................. 705/76 |

FOREIGN PATENT DOCUMENTS

GB  2215897  * 9/1989

OTHER PUBLICATIONS

"The automatic Identification/Barcode Equipment Market is Showing its (Magnetic) Stripes", Sensors & Instrumentation News, v 2, n 3, p N/A, Apr. 1988.*

* cited by examiner

*Primary Examiner*—Michael Cuff
(74) *Attorney, Agent, or Firm*—McHale & Slavin PA

(57) ABSTRACT

A system and method for establishing a debit account via a point of sale transaction terminal which is in communication with a secure host server. The transaction terminal includes an operating program for initiating a point of sale transaction to accept funds from a customer to be deposited into a debit account; transmitting the amount of the funds to the secure host server, receiving a debit account number and personal identifier number (PIN) unique to the transaction from the secure host server; and providing a printed receipt to the customer with the debit account number and PIN. The secure host server creates a debit account having a unique debit account number specific to the transaction, stores a electronic representation of currency equivalent to the input value into the debit account; and associates a personal identification number (PIN) with the debit account. The invention further includes a database for storing the debit account number and PIN number which also maintains account balance information associated with the debit account number. The funds can then be withdrawn from the debit account by a customer using the debit account number and PIN. Personal identification data from the customer is not required to establish the account, and the account holder identity can remain anonymous.

8 Claims, 9 Drawing Sheets

SYSTEM AND METHOD FOR DEBIT ACCOUNT TRANSACTIONS

CROSS REFERENCE TO RELATED APPLICATIONS

This application is a continuation-in-part of applicant's co-pending U.S. application Ser. No. 09/334,887 filed Jun. 17, 1999, which is based upon and claims priority under 35 U.S.C. Section 119 from Provisional Application No. 60/089,755 filed Jun. 18, 1998, the contents of which are hereby incorporated by reference.

FIELD OF THE INVENTION

This invention relates to financial transaction processing systems. Specifically, the invention relates to a system and method for establishing a globally accessible debit account via a point of sale (POS) terminal.

BACKGROUND OF THE INVENTION

Many financial transactions are now executed electronically, and the trend today is toward a virtually "cashless" economic system. Forms of cashless commercial transactions include credit card transactions, bank card ATM debit transactions, and transactions with prepaid cards.

In a credit card transaction, a customer presents the card to a vendor, and the vendor typically obtains on-line authorization for the purchase. If authorized, the purchase if executed, and the vendor obtains payment from the credit card company.

In a bank card debit transaction, a vendor requests payment directly from the customer's bank account from an on-line point of sale terminal. The bank transfers the transaction amount from the customer's account to the account of the vendor.

Pre-paid cards can also be used in commercial transactions. In this system, the customer purchases a pre-paid card from a vendor. Pre-paid cards are generally purchased for specific goods or services to provide the customer with a temporary convenient means to perform certain cashless transactions. Pre-paid cards can utilize off-line authorization methods wherein the account balance is stored on a memory device incorporated into card itself. Examples of off-line pre-paid cards include tokens for vending machines and public transportation. Third party online authorization methods for pre-paid cards can also be used where the customer has provided funds which are deposited in a third party account for payment of debit transactions. The accounts are settled by the third party using on-line authorization procedures. A commonly used type of on-line pre-paid card is a telephone long distance card. A drawback of pre-paid cards is that they require the customer to purchase goods and services in advance of the planned use or acquisition of the goods and services.

The prevalence of electronic commerce raises concerns of the consumer's right to privacy. Credit and ATM bank debit card purchases are not truly analogous to cash purchases in that credit and debit card purchases are always associated with the identity of the account holder. Consumers purchasing goods and services using credit or debit cards may unwittingly become subjects of market research where their purchasing habits can be tracked by a third party. Credit and bank debit card systems have the advantage of providing global access to currency, however such systems do not allow for anonymous transactions. It would therefore be desirable to provide a debit account system which offers global accessability, and also protects the identity of the consumer. Ideally, personal identification data would not be necessary to establish a debit account in such a system.

In many purchasing situations, credit cards and bank debit cards are becoming the standard means of executing financial transactions. Many individuals are extremely disadvantaged in today's "cashless" environment in that they do not have the means to acquire credit cards, and lack sufficient means to maintain a bank account. It would be highly desirable to create a system where any individual could quickly and conveniently establish a debit account which has the functionality of a credit or debit card for making purchases or acquiring cash. In order to provide ease of access to the system, it would also be desirable to provide the means to establish such an account at a POS transaction terminal which would typically used at a merchant locations.

With the use of plastic cards, such as magnetic strip cards, there is always a risk that the card itself will become lost or stolen. If a plastic card is issued by a merchant, the merchant must maintain an inventory of plastic cards. Thus there is a production cost associated with the plastic card system. To ensure universal portability of the account, and to protect against lost or theft of account information, it would be highly advantageous to have a debit account system which does not require plastic cards or other physical tokens to execute a transaction.

Pare, Jr. et al., U.S. Pat. No. 6,192,142, discloses a debit account system which is "tokenless" in that plastic cards or other payment implements are not used. Instead, the system uses biometric identification data, such as fingerprint or retinal scanners, to identify the account and account holder. Universal implementation of this system would be problematic due to the expense involved in the installation of biometric scanner equipment. In contrast, the system of the present invention provides an distinct advantage over Pare, Jr. et al. in that it establishes a "tokenless" debit account while operating in conjunction with existing equipment, financial systems and protocols.

SUMMARY OF THE INVENTION

It is an object of the invention to allow customers to establish debit accounts in an easy and efficient manner at conventional point of sale transaction terminals which are typically available to customers at merchant locations.

It is another object of the invention to allow customers to establish debit accounts without providing personal identification data, thereby assuring the anonymity of the account.

It is a further object of the invention provide a debit account system which does not require physical payment implements such as plastic debit cards, magnetic stripe cards, smart cards, etc.

It is still another object of the invention to provide a value debit account system which permits "paperless" financial transactions.

It is still a further object of the invention to provide a debit account system which is globally accessible.

In accordance with the above objects, a system and method for debit account transactions is provided. In contrast to existing debit account systems, the system and method of the invention allows a consumer to establish a globally accessible debit account in a single transaction at a merchant location without requiring the consumer to provide personal identification data. The system of the invention allows "paperless" and "tokenless" access to the debit account by the consumer. The invention comprises a system for establishing a debit account via a point of sale transaction which includes a transaction terminal having input means, display means, and processing means; printing means operatively coupled to the transaction terminal; communications means integral to the transaction terminal; and a secure host server in communication with the transaction terminal. The transaction terminal is further adapted to include an operating program for performing a series of steps including: initiating a point of sale transaction to accept funds from a customer to be deposited into a debit account; accepting an input value representing finds to be deposited into the debit account; accessing the secure host server via the communications means; transmitting the input value to the secure host server; receiving a debit account number unique to the transaction from the secure host server; receiving a unique personal identifier number (PIN) corresponding to the debit account number from the secure host server, and providing a printed receipt to the customer with the debit account number and PIN. The funds can then be withdrawn from the debit account by a customer using the debit account number and PIN. Personal identification data from the customer is not required to establish the account, and the account holder identity can remain anonymous.

The secure host server is operatively coupled to a processing means which includes an operating program for performing the steps of: creating a debit account specific to the transaction, assigning a unique debit account number with to the debit account; storing an electronic representation of currency equivalent to the input value into the debit account; and associating a personal identification number (PIN) with the debit account.

The invention further includes a database for storing the debit account number and PIN number which also maintains account balance information associated with the debit account number. The debit account is indexed in the database by the debit account number and the personal identification number without associating the debit account with personal identification information from a customer.

In an alternative embodiment, the system can include a means for assigning a customer-selected PIN to the debit account number. The means can comprise a keypad available to the customer to accept entry of the PIN. The means for assigning a personal identifying data can also comprise an apparatus for obtaining biometric data from the customer, such as a handprint, fingerprint, or retina scanners, or voice recognition apparatus.

The invention also includes a method for establishing a debit account at a point of sale transaction terminal including the steps of initiating a point of sale transaction to accept funds from a customer to be deposited into a debit account; inputting a value representing funds to be deposited into the debit account into the transaction terminal; communicating the input value to a secure host server operated by a financial service provider; receiving a debit account number unique to the transaction from the secure host server; and providing the debit account number to the customer. The method further includes the step of receiving a unique personal identifier number (PIN) corresponding to the debit account number from the secure host server. Alternatively, a customer-selected PIN is assigned to the debit account number. A printed confirmation is provided comprising a receipt specific to the transaction which includes the debit account number and the amount of the funds deposited in the debit account. A printed receipt including the PIN can also be provided. As an alternative to the use of PIN's, the system and apparatus further contemplates the use of biometric data as personal identification data, such as hand and fingerprint scanners, retinal scans, and voice recognition.

The secure host compiles order information specific to the transaction which includes a merchant identifier and the total dollar amount of the transaction. The method further includes the steps of the secure host communicating the order information from a plurality of customers to an automated clearing house; the automated clearing house communicating the order information to a bank having an account for the merchant; the bank for the merchant transferring funds associated with the order to the automated clearing house, and the automated clearing house transferring the transferred funds to a second bank having an account for the financial services provider.

A key aspect of the present invention is that the system is implemented using the POS terminal that is commonly owned by a merchant. No specialized equipment is required. The merchant utilizes its existing equipment using the protocol of the present invention to access the secure host server and establish a debit account in the amount corresponding to the funds provided by the customer to the merchant.

The present invention also allows the merchant to access the secure host server on a daily basis to determine transaction totals for his review. The secure host server returns the transaction information that relates to the merchant for that day as of the time of the request.

The system does not require standard POS payment implements such as plastic cards, smart cards, etc. Therefore the outlay of capital on behalf of the merchant is minimized. Further, the possibility of theft of a card is eliminated.

Further details of the system will be apparent from the detailed description of the preferred embodiment which follows.

DETAILED DESCRIPTION OF THE INVENTION

As noted above, the present invention is a system and method for establishing a debit account using existing point of sale (POS) equipment at a merchant location.

Figure 1A:
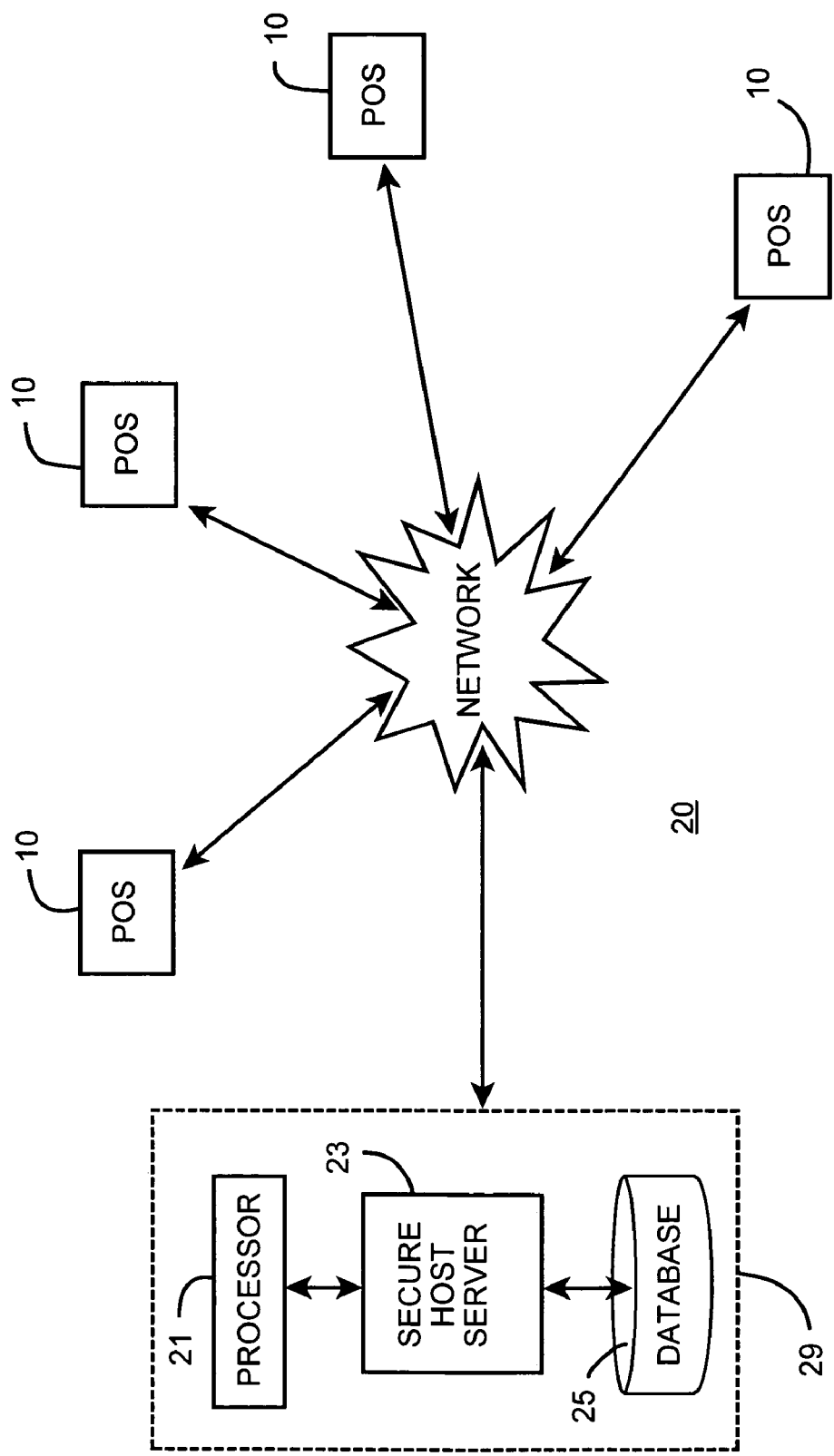
FIGS. 1A and 1B illustrate the overall architecture of the system of the present invention.
Figure 1B:
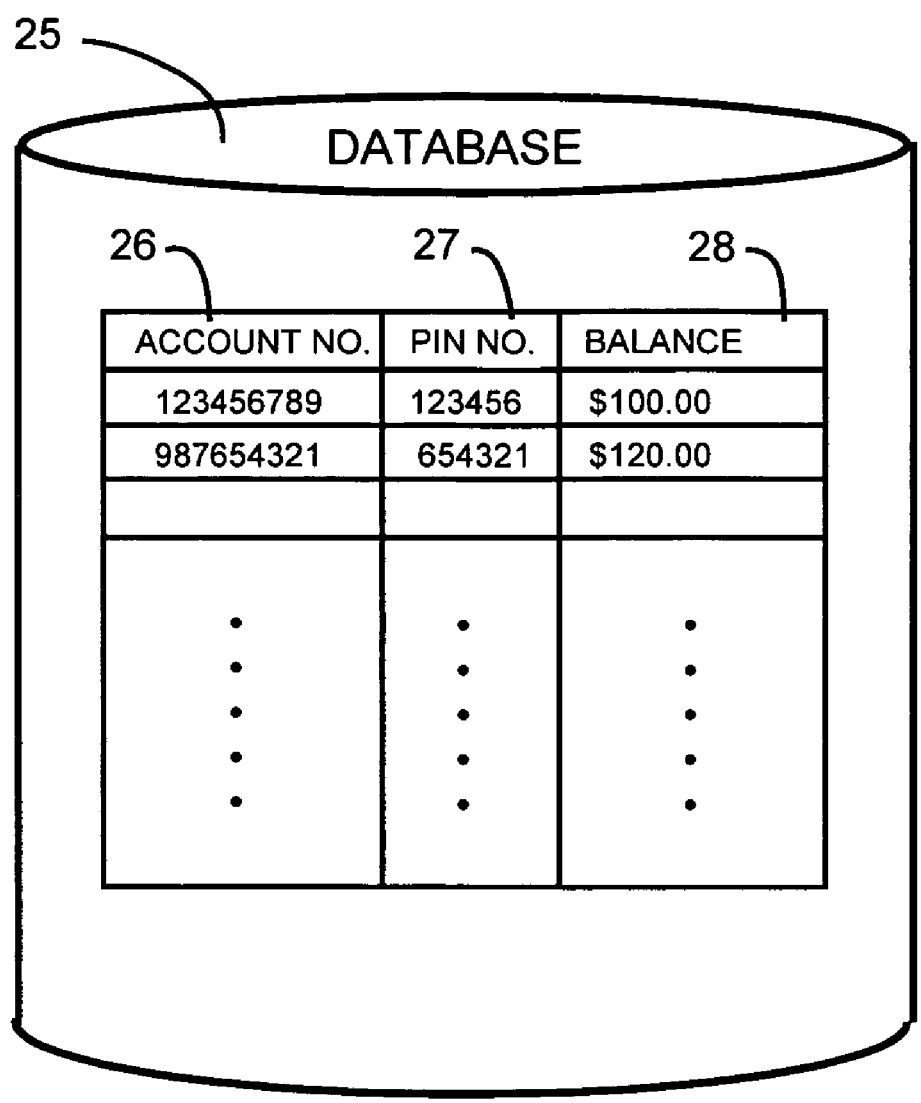

Referring to FIGS. 1A and 1B, the overall architecture of the present invention is illustrated. A plurality of POS transaction terminals 10 communicate with a secure host service 23 operated by a financial service provider 29 via a telephone network 11. The plurality of POS transaction terminals 10 in the illustration can be in the same physical location at a single merchant location, or can be affiliated with a plurality of merchants in different physical locations. The form of communication illustrated is a telephone network over normal PSTN telephone lines. However, it is also within the scope of the invention to have the network communicating via a satellite, an Internet work, or any other form of network wherein transactions from the individual POS transaction terminals 10 to the secure host server 23.

Figure 2:
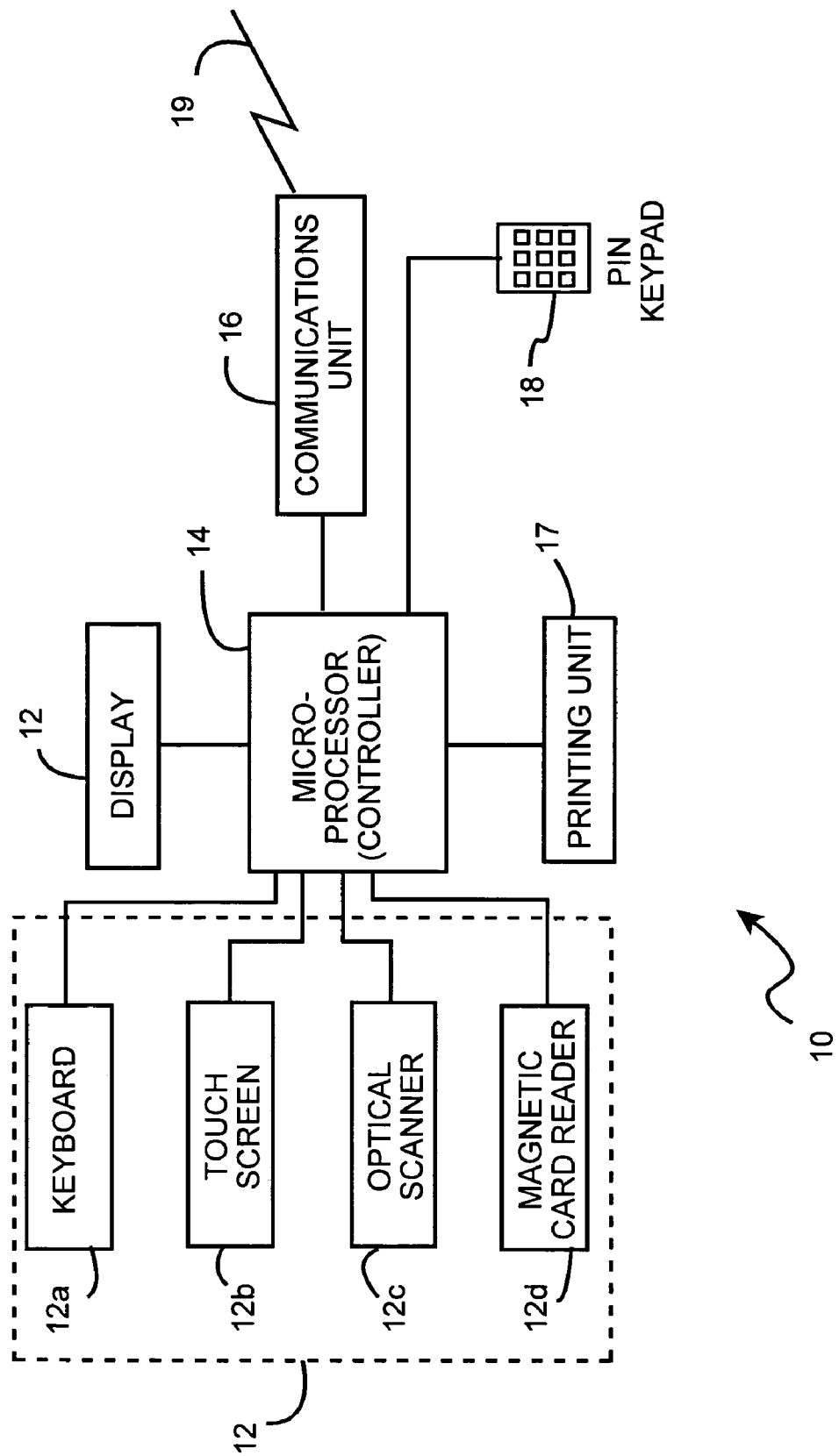
FIG. 2 is a block diagram illustrating a point of sale (POS) transaction terminal according to an embodiment of the invention

The POS terminal 10 is described in FIG. 2. In the preferred embodiment, the POS terminal 10 is of the type in use today by retail merchants, such as those manufactured by Verifone, Inc. The POS terminal 10 includes input means 12, a display means 13, a magnetic strip card reader 11, a communication unit 16, a data connection 19, a microprocessor 14, and a printing 17 which are either integral to the POS terminal or are adapted for operative coupling with the POS terminal 10. The input means 12 can include, but is not limited to, alphanumeric keyboard 12a, touch screen 12b, optical scanner 12c, and magnetic card reader 12d. The communication unit 16 is capable of electronic data communication with external databases via data connection 19. In the illustrated embodiment using a telephone line network, the communications unit 16 is preferably a modem. If the communication unit 16 is a modem, the data connection 19 can be a telephone line connection. In alternative embodiments utilizing other forms of communication, other methods of electronic data transmission may be used to establish the data connection 19. The POS terminal 10 can also be in communication with a means for accepting input data from a customer, such as keypad 18.

Figure 3:
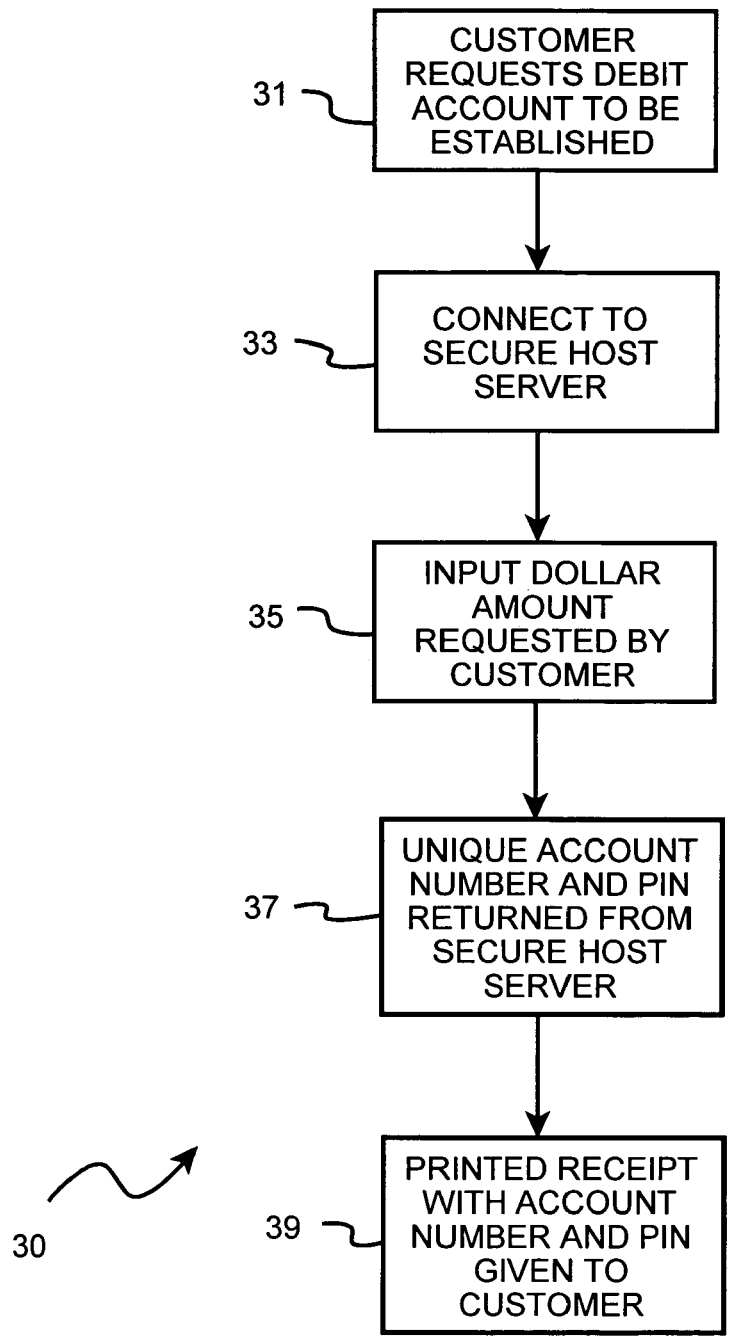
FIG. 3 illustrates the steps performed by the operating program of the transaction terminal in a first embodiment of the invention in which a PIN is assigned to an account by the secure host server.

In order to establish a debit account in accordance with the invention, the microprocessor 14 includes an operating program performing a series of steps 30 as shown in FIG. 3. At the merchant POS terminal (typically operated by a clerk), a customer requests that a debit account be established in an amount determined by the customer (step 31). The customer provides the merchant with the appropriate funds at the time of the transaction. As used herein, the term "funds," refers to any equivalent of legal currency, including hard currency, electronic currency (issued through credit or debit cards), or negotiable instruments. The clerk initializes the transaction by entry of a predetermined input using input means 12. In a preferred embodiment, a clerk preferably also enters a clerk identifier, such as a identification number, to allow the merchant to track the activity of the merchant's employees. Using communication technology well-known in the art, the POS terminal 10 contacts and connects to the secure host server 23 of financial service provider 29 via communication unit 19 (step 33). After an appropriate prompt is displayed on display 13, the clerk enters an value equivalent to the funds provided by the customer into POS terminal 10 using input means 12 (step 35). The secure host server 23 then returns a unique debit account number and personal identification number (PIN) to the POS terminal 10 (step 37). The customer is then provided with a printed copy of the debit account number and PIN (step 39).

Figure 4:
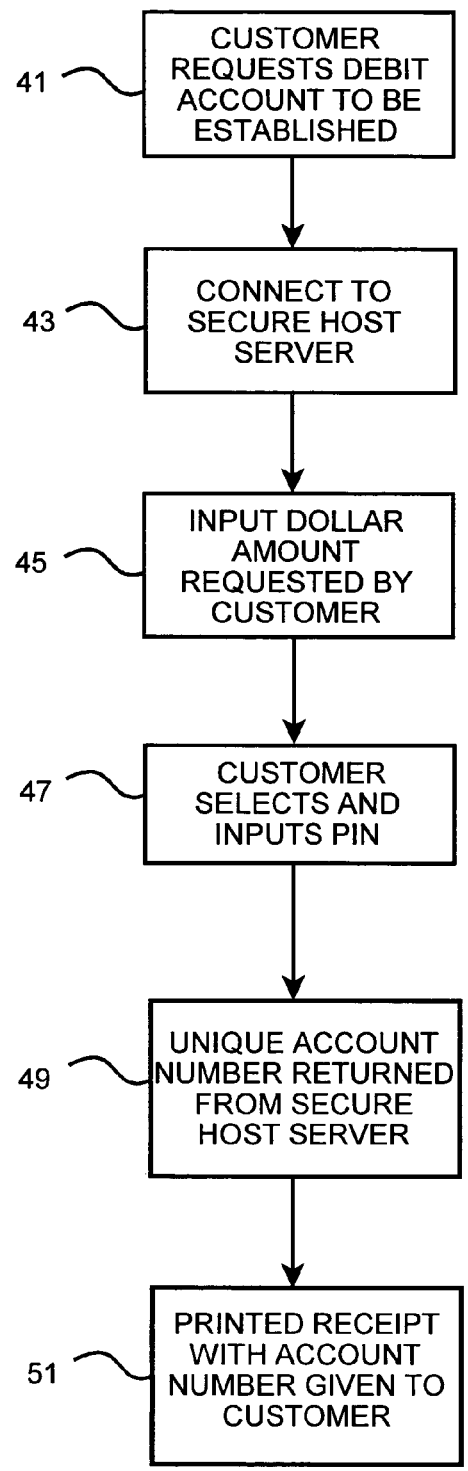
FIG. 4 illustrates the steps performed by the operating program of the transaction terminal in a second embodiment of the invention in which a PIN is selected by customer during the transaction.

FIG. 4 illustrates the operative steps 40 of an alternative embodiment to that shown in FIG. 3. The POS terminal 10 contacts and connects to the secure host server 23 of financial service provider 29 via communication unit 19 (step 43). After an appropriate prompt is displayed on display 13, the clerk enters an value equivalent to the funds provided by the customer into POS terminal 10 using input means 12 (step 45). The customer then selects a PIN to be assigned to the account in such a manner that the PIN will be known only to the customer (step 47). A preferred method of assigning the PIN is using the keypad 18 (FIG. 1) for manual entry of the PIN by the customer. The secure host server 23 then returns a unique debit account number which is associated with the customer selected PIN to the POS terminal 10 (step 49). The customer is then provided with a printed copy of the debit account number and PIN (step 51).

Figure 5:
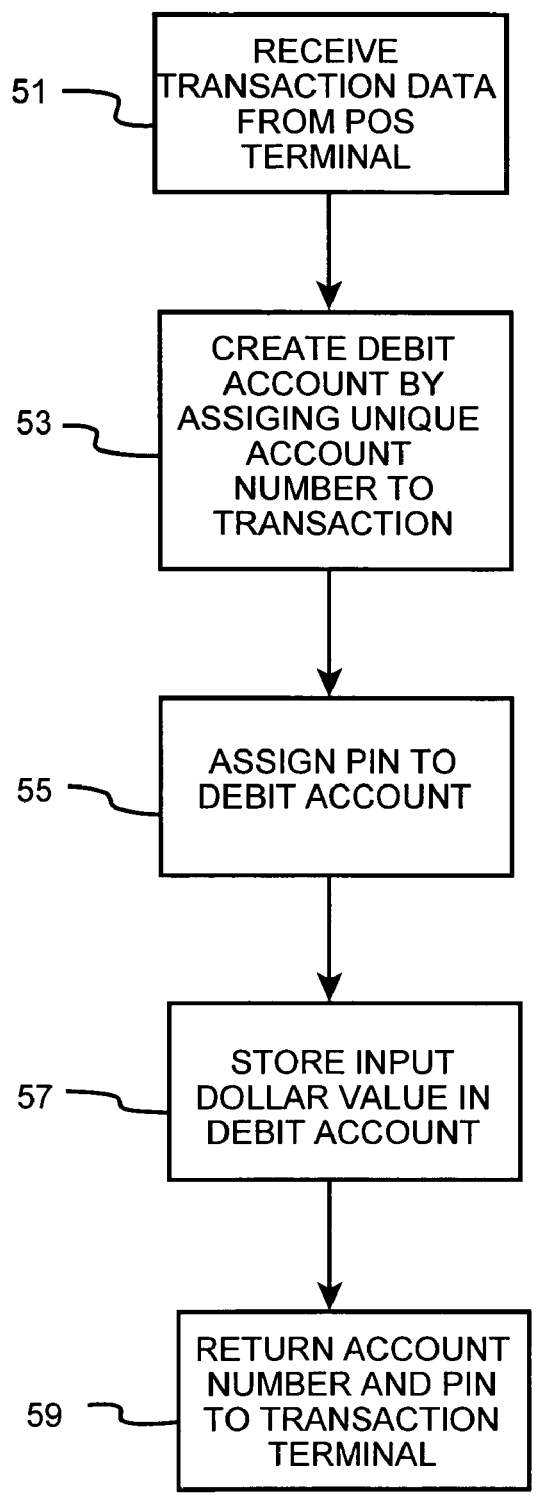
FIG. 5 illustrates the steps performed by operating program of the secure host server.

Referring again to FIGS. 1A and 1B, it is seen that the secure host server is operatively associated with a processor 21 and a database 25. The processor 21 preferably includes an operating program which performing a series of steps 50 as shown in FIG. 5. The steps 50 are reciprocal to the steps 30 and 40 performed by the POS terminal. In step 51, the secure host server receives the transaction data from the POS terminal. The transaction data preferably includes the dollar value of the transaction and a merchant identifier. The processor 21 creates a debit account by assigning a unique debit account number to the transaction (step 53). In step 55, a PIN is assigned to be debit account. The PIN can be either selected by the customer and transmitted to the secure host server 23 (as described by FIG. 4) or randomly generated by the processor 21 and return to the POS terminal (as described by FIG. 3). An electronic representation of the dollar value of the transaction is then stored in the debit account (step 57). The debit account number is then returned to the POS terminal (step 59).

The database 25 (FIG. 1B) maintains the debit account data (including the balance 28, debit account number 26 and PIN 27) for a plurality of customers. The debit account data is indexed by the debit account number 26, PIN 27 and balance 28 without maintaining the personal identification data of the customer in the database 25. The present invention thus allows the customer to establish an anonymous debit account which can be accessed using the only the debit account number in conjunction with the corresponding PIN.

The debit account number can provide global access to the funds in the customer's account by use at merchant locations, ATM machines, transactions conducted via telephone, Internet transactions, mail order purchases, etc. The system of the present invention is easily adapted for global implementation as it does not require tokens, such as plastic cards, or the installation of specialized equipment at merchant locations. Providing both a debit account number and a corresponding PIN ensures the security of the account against theft. The PIN is preferably relatively short (for example, a 4 digit number or a short word) for ease of memorization. In the practice of the invention, the PIN is preferably either memorized by the customer or securely segregated from the printed debit account number to guard against possible physical theft of the debit account number.

Conducting financial transactions in the practice of the invention is readily accomplished using existing electronic funds transfer networks and protocols, and it is therefore not necessary to implement specialized financial system networks to practice the invention. The electronic transfer of funds in the present invention is preferably accomplished through the Automated Clearing House (ACH) Network. The ACH network is a batch-oriented electronic funds transfer system used by retail and commercial organizations which provides for the distribution and settlement of electronic credits and debits among financial institutions. The network includes over thirty regional ACH associations in the U.S. which provide paperless central clearing capabilities for financial institutions. ACH operators include the Federal Reserve Bank, American Clearing House, New York Clearing House, and VisaNet ACH. Each ACH operator can receive transactions over the network and then split and route the debit and credit portions of the transactions to the payer's and payee's banks. The methods and mechanisms by which debit transactions can be performed vis-á-vis electronic funds transfer networks are well-known in the art, and are therefore not discussed herein in greater detail.

Figure 6:
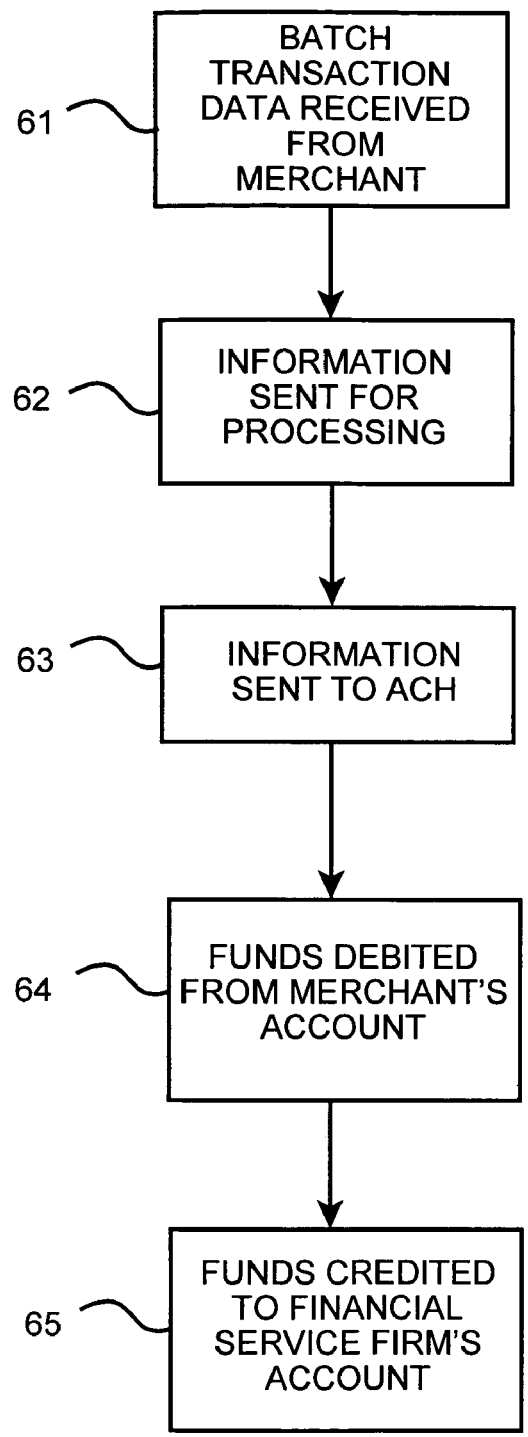
FIG. 6 illustrates the processing of the transactions through the ACH.

FIG. 6 illustrates the back end processing of the transactions through the ACH. The secure host server receives batch transaction data from the merchant POS terminals 61. The data is aggregated over the course of a day. The summary information is then sent for batch processing 62. This is the total amount that is held for electronic settlement. The information is sent to the ACH Network for settlement at the conclusion of each business day 63. The system then reconciles the account and performs a bank card like close-out procedure which signals the readiness for initiating the electronic settlement of all transactions. Thereafter, the merchant's account at the merchant's bank is debited 64 with the amounts that are to be assigned to the financial service provider. The funds are then credited to the financial service firm's bank account 65.

Figure 7:
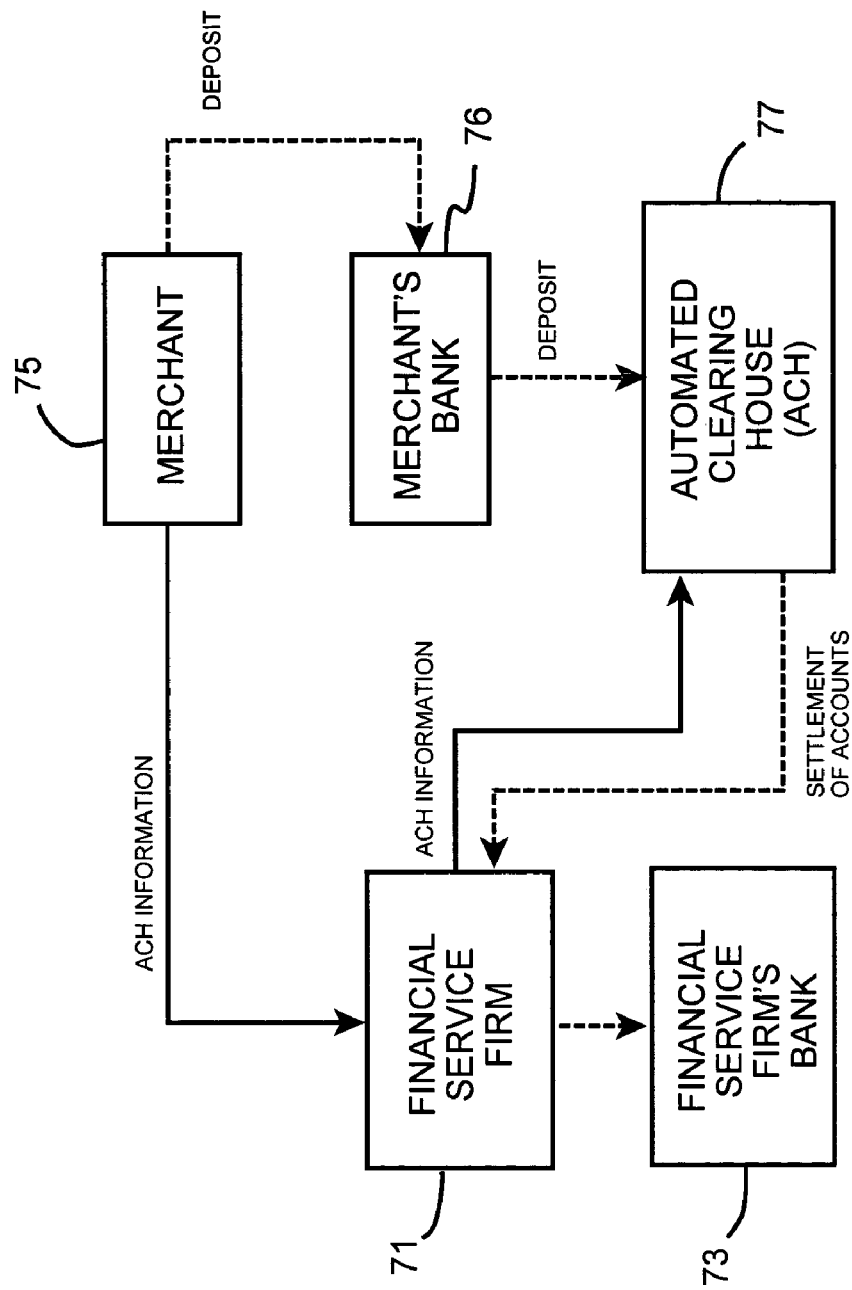
FIG. 7 illustrates the transaction and funds flow of the present invention.

Referring to FIG. 7 the funds flow of the present invention is illustrated. The secure host server of the financial service firm 71 transmits account numbers to the POS terminal at a merchant 75. After the merchant receives funds from customers, those funds are deposited in the merchant's bank 76. Simultaneously, information on the transactions made during the day are conveyed to the secure host server of the financial service firm 71 which also has the capability to perform administrative functions associated with the present invention. Here the administrative function is illustrated as the financial service firm 71, although this is not meant to be a limitation since this function can be performed at a physically different facility by the secure host. Information received from the merchant is sent to the ACH 77 to effect the transfer of funds.

The merchant's bank 76 returns funds to the ACH 77 which in turn forwards the funds received for reconciliation with the financial service firm. Again this reconciliation is represented as the financial service firm 71, however, this function can be carried out at the physically separate facility. The present invention then forwards funds, as agreed, to the financial service firm's bank or stores the funds in an account for the benefit of the service provider.

Figure 8:
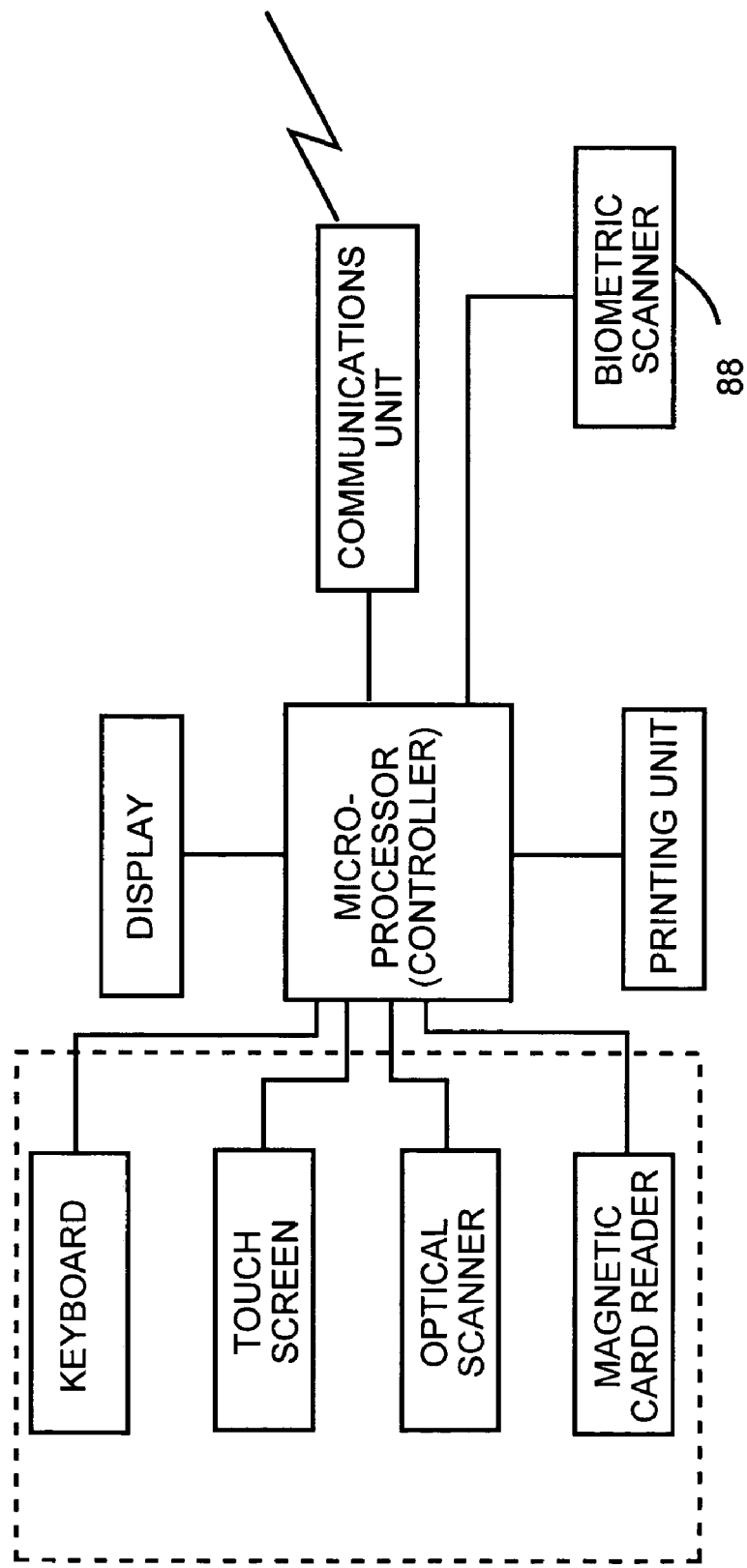
FIG. 8 illustrates an alternative embodiment of the invention which the utilizes a biometric PIN.

In an alternative embodiment of the system described in FIG. 4, the customer-selected PIN can comprise the personal biometric data of the customer. Referring to FIG. 8, it is seen that the terminal 10 includes a biometric scanner 88. The biometric scanner can be any suitable mechanism capable of collecting and digitizing personal physical identification data. Suitable devices would include fingerprint scanners, retinal scanners, and voice recognition devices. Again referring to FIG. 4, the customer inputs a PIN in step 47 via the biometric scanner 88.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

I claim:

1. A system for establishing a debit account via a point of sale transaction comprising:
   (a) a transaction terminal, said terminal including input means, display means, and processing means;
   (b) printing means operatively coupled to said transaction terminal;
   (c) communications means integral to said transaction terminal;
   (d) a secure host server in communication with said transaction terminal;
   (e) said transaction terminal including: means for initiating said point of sale transaction to accept funds from a customer to be deposited into a debit account; means for accepting an input value representing funds to be deposited into said debit account; means for accessing said secure host server via said communications means; means for transmitting said input value to said secure host server; means for receiving a debit account number unique to said transaction; means to assign a customer selected personal identification number (PIN) to said debit account number during said transaction; and means for providing said debit account number and said PIN to said customer in readable format.

2. The system of claim 1, wherein said secure host server is operatively coupled to a processing means; said processing means including: means for creating a debit account specific to said transaction, means for assigning a unique debit account number to said debit account; and means for storing an electronic representation of currency equivalent to the input value into said debit account; and means for associating said personal identification number (PIN) with said debit account.

3. The system of claim 2, wherein said debit account is indexed in said database by said debit account number and said PIN.

4. The system of claim 1, further comprising a database for storing said debit account number, said database further including account balance information associated with said debit account number, wherein said funds can be withdrawn from said debit account by a customer using said debit account number and said PIN.

5. The system of claim 4, wherein said debit account is indexed in said database by said debit account number and said customer selected PIN.

6. The system of claim 1, wherein said printing means generates a printed receipt specific to said transaction containing said account number and said PIN.

7. The system of claim 1, wherein said means to assign a customer-selected PIN to said debit account number comprises a keypad operatively connected to said transaction terminal.

8. The system of claim 1, wherein said means to assign a customer-selected PIN to said debit account number comprises a biometric scanning apparatus.

* * * * *